H. O. LARSON.
COOKING UTENSIL.
APPLICATION FILED JULY 2, 1919.
1,338,378.
Patented Apr. 27, 1920.
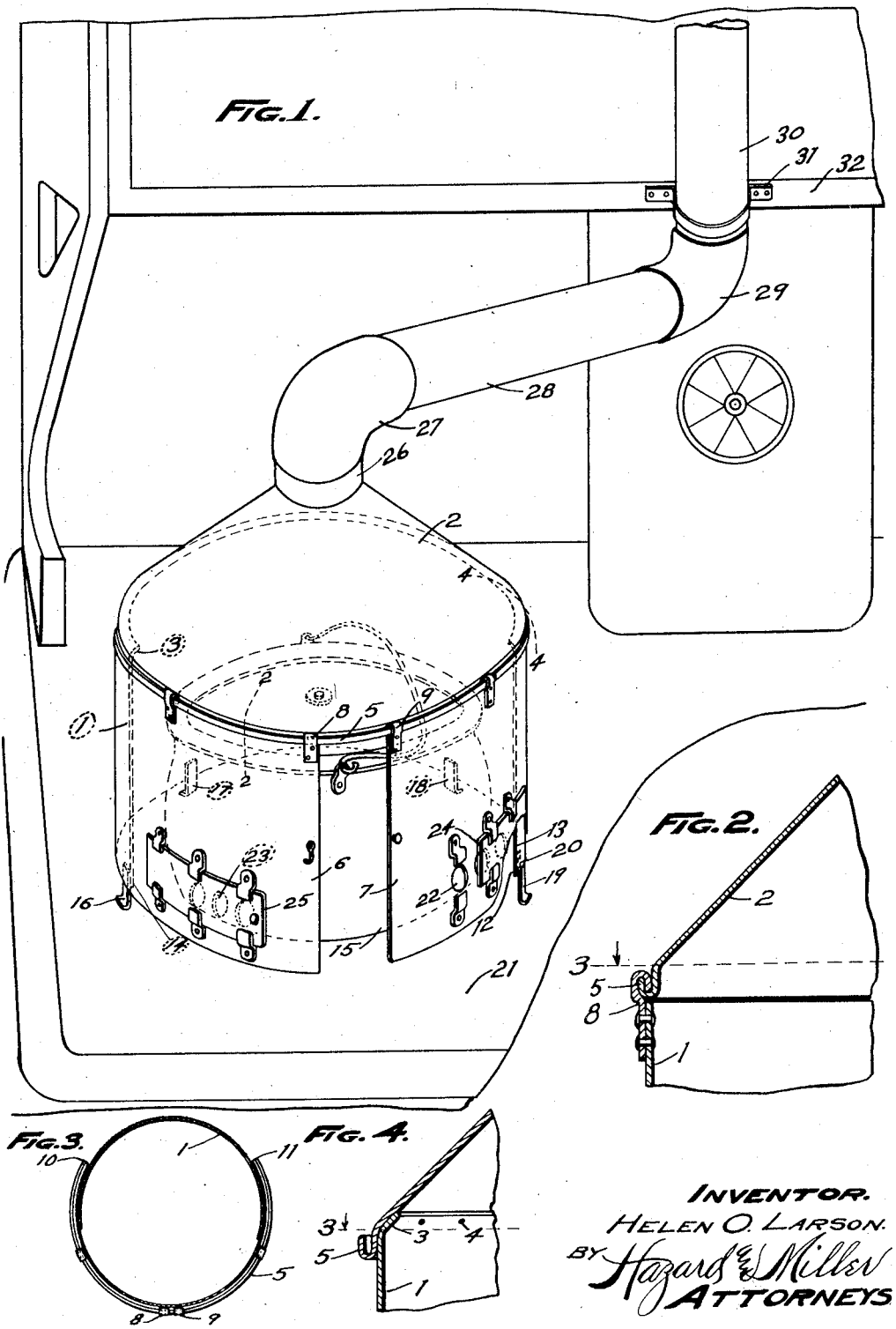
INVENTOR.
HELEN O. LARSON.
BY Hazard & Miller
ATTORNEYS

UNITED STATES PATENT OFFICE.

HELEN O. LARSON, OF LOS ANGELES, CALIFORNIA.

COOKING UTENSIL.

1,338,378.  Specification of Letters Patent.  Patented Apr. 27, 1920.

Application filed July 2, 1919. Serial No. 308,203.

*To all whom it may concern:*

Be it known that I, HELEN O. LARSON, a citizen of the United States, residing at Los Angeles, in the county of Los Angeles and State of California, have invented new and useful Improvements in Cooking Utensils, of which the following is a specification.

My invention relates to cooking utensils and consists of the novel features herein shown, described and claimed.

The principal object of my invention is to make a cover to surround a kettle and rest upon the stove top or grate and carry away the odor from cooking cabbage and the like, and to make the cover so that the cooking operation may be conveniently carried on while the flue is connected and operating.

Figure 1 is a fragmentary perspective showing a cooking utensil embodying the principles of my invention is use, parts of the stove being broken away.

Fig. 2 is an enlarged sectional detail through a sliding door and hanger and taken on the line 2—2 of Fig. 1.

Fig. 3 is a reduced horizontal section showing the mounting of the sliding doors.

Fig. 4 is a fragmentary sectional detail on the line 4—4 of Fig. 1.

The main body 1 is circular in plan and practically straight up and down and extends through substantially two-thirds of a circle. A conical top 2 fits upon the upper edge of the body 1. The upper edge 3 of the body 1 is turned inwardly and fits up against the lower face of the top and is secured in place by rivets 4.

The door hanger 5 extends from the edge of the top 2 downwardly and upwardly and is hook-shaped in cross section and annular in plan and outside of the body 1. The doors 6 and 7 have straps 8 and 9 interlocking with the hanger 5 so that the upper edges of the doors fit against the hanger 5, and the straps 8 and 9 are riveted to the doors and extend upwardly and downwardly and slide in the hanger 5.

The hanger 5 extends through about two-thirds of a circle and terminates at the ends 10 and 11 so that the doors may be moved backwardly to the back side of the body 1 and run off the hanger. The doors 6 and 7 are adapted to close the opening 12 between the edges 13 and 14 of the body 1, and when the doors are open a kettle 15 or the like may be inserted through the door opening to a central position within the cooker.

Legs 16, 17, 18 and 19 extend downwardly from the body 1 so as to hold the lower edge 20 of the body slightly above the upper face 21 of the stove and allow air to pass under the edge 20. Damper openings 22 and 23 are formed through the doors 6 and 7, and dampers 24 and 25 are slidingly mounted to cover and uncover the opening.

When the cooker is standing upon a grate as upon a gas stove the legs 16, 17, 18 and 19 may extend downwardly through the grate and the edge 20 rest upon the grate. The legs are adapted to hold the edge 20 a limited distance above the stove top 21 and the additional draft may be accurately regulated by manipulating the dampers 24 and 25. The nipple 26 extends upwardly from the center of the top 2, the elbow 27 is placed upon the nipple, a length of stove pipe 28 is connected to the elbow 27, an elbow 29 is connected to the pipe 28, and a pipe 30 extends upwardly from the elbow 29. A strap 31 extends around the pipe 30 and is secured to the frame 32 of the stove so as to make a swivel connection so that the cooker may be moved laterally in the plane concentric to the pipe 30 as required to move the cooker from one part of the stove top 21 to another.

Thus I have produced a cooking utensil comprising an annular wall having door openings, a cover fixed upon the annular wall, doors slidingly mounted to open and close the door openings, and a flue for carrying off the odor.

Various changes may be made without departing from the spirit of my invention as claimed.

I claim:

1. A cooking utensil comprising a main body wall circular in plan and straight up and down and extending through substantially two-thirds of a circle, a conical top fitting upon the upper edge of the main body, the upper edge of the main body being turned inwardly and fitting upwardly against the lower face of the top and secured in place by rivets, the edge of the top outside of the rivets being turned downwardly, outwardly and upwardly to form a door hanger, doors fitting the main body and fitting upwardly against the door hanger. Straps secured to the upper parts of the doors and interlocking with the door hanger so that the doors will slide upon the hanger and will not move upwardly or downwardly, the door hanger extending across the opening between the vertical edges of the main body so the doors may be moved into place to cover the opening, and a pipe leading from the apex of the conical top.

2. A cooking utensil comprising a main body wall circular in plan and straight up and down and extending through substantially two-thirds of a circle, a conical top fitting upon the upper edge of the main body, the upper edge of the main body being turned inwardly and fitting upwardly against the lower face of the top and secured in place by rivets, the edge of the top outside of the rivets being turned downwardly, outwardly and upwardly to form a door hanger, doors fitting the main body and fitting upwardly against the door hanger, straps secured to the upper parts of the doors and interlocking with the door hanger so that the doors will slide upon the hanger and will not move upwardly or downwardly, the door hanger extending across the opening between the vertical edges of the main body so the doors may be moved into place to cover the opening, a pipe nipple extending from the apex of the conical top, an elbow loosely mounted upon the pipe nipple, a pipe rigidly mounted, an elbow loosely mounted upon the rigid pipe, and a connection between the two elbows so that the cooking utensil may move laterally in a line concentric to the rigid pipe.

In testimony whereof I have signed my name to this specification.

HELEN O. LARSON.